(12) United States Patent
Lin (10) Patent No.: US 7,015,966 B1
(45) Date of Patent: Mar. 21, 2006

(54) REDUCING DISCONTINUITIES IN SEGMENTED IMAGING SENSORS

(75) Inventor: Denny M. Lin, Fountain Valley, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/267,781

(22) Filed: Mar. 15, 1999

(51) Int. Cl.
*H04N 3/14* (2006.01)
*H04N 5/335* (2006.01)

(52) U.S. Cl. .................. 348/324; 348/315
(58) Field of Classification Search ........... 348/218.1, 348/321, 323, 324; 382/303, 284; 358/450
See application file for complete search history.

(56) References Cited

U.S. PATENT DOCUMENTS

| | | | | |
|---|---|---|---|---|
| 4,484,349 | A * | 11/1984 | McCubbrey | 382/303 |
| 4,598,321 | A | 7/1986 | Elabd et al. | 358/213 |
| 4,665,440 | A * | 5/1987 | Tromborg | 348/316 |
| 4,692,812 | A | 9/1987 | Hirahara et al. | 358/285 |
| 4,797,942 | A | 1/1989 | Burt | 382/41 |
| 4,821,103 | A | 4/1989 | Busby | 358/213.26 |
| 5,047,858 | A | 9/1991 | Aimonoya | 358/183 |
| 5,153,421 | A * | 10/1992 | Tandon et al. | 250/208.1 |
| 5,159,455 | A | 10/1992 | Cox et al. | 358/213 |
| 5,210,614 | A | 5/1993 | Kannegundla et al. | 358/213.28 |
| 5,220,626 | A | 6/1993 | Suganuma et al. | 358/483 |
| 5,297,222 | A * | 3/1994 | Mori et al. | 382/318 |
| 5,379,067 | A | 1/1995 | Miura | 348/311 |
| 5,432,551 | A | 7/1995 | Matsunaga | 348/299 |
| 5,523,788 | A * | 6/1996 | Kannegundla et al. | 348/321 |
| 5,572,037 | A | 11/1996 | Liu et al. | 250/483.1 |
| 5,598,261 | A | 1/1997 | Duncan et al. | 356/121 |
| 5,634,067 | A | 5/1997 | Nagazumi | 395/800 |
| 5,764,288 | A | 6/1998 | Gorelik | 348/311 |
| 5,805,216 | A | 9/1998 | Tabei et al. | 348/246 |
| 5,834,782 | A | 11/1998 | Schick et al. | 250/370.11 |
| 5,896,172 | A | 4/1999 | Korthout et al. | 348/248 |
| 5,953,462 | A * | 9/1999 | Yamada et al. | 382/284 |
| 6,002,492 | A * | 12/1999 | Kamon et al. | 382/284 |
| 6,212,303 | B1 * | 4/2001 | Doran et al. | 382/304 |
| 6,396,960 | B1 * | 5/2002 | Yoshimura | 382/284 |
| 6,744,931 | B1 * | 6/2004 | Komiya et al. | 382/284 |
| 2003/0133019 | A1 * | 7/2003 | Higurashi et al. | 348/218.1 |

FOREIGN PATENT DOCUMENTS

| | | |
|---|---|---|
| EP | 0 866 502 | 9/1998 |
| WO | 94/18789 | 8/1994 |

OTHER PUBLICATIONS

"The mKxnK image sensor, a modular CCD.", Philips Imaging Technology, 1995.
U.S. Statutory Invention Reg. No. H1617, Fuller, Jr., Dec. 1996.

* cited by examiner

*Primary Examiner*—Ngoc-Yen Vu
*Assistant Examiner*—Jason Whipkey
(74) *Attorney, Agent, or Firm*—Fitzpatrick, Cella, Harper & Scinto (57) ABSTRACT

A segmented imaging sensor having plural output pipelines in correspondence to the number of segments. Discontinuities between segments of the electronic imaging sensor are reduced by providing duplicated pixel values for pixels in an overlap region between segments, and by providing the duplicated pixels to processors that process the output from pipelines whose segments border on the overlap region.

8 Claims, 5 Drawing Sheets

REDUCING DISCONTINUITIES IN SEGMENTED IMAGING SENSORS

BACKGROUND OF THE INVENTION

1. Field of the Invention

The present invention relates to electronic imaging sensors, such as charge coupled devices (CCDs), that are segmented into plural segments with a respective one of plural output pipelines for each segment. In particular, the invention pertains to duplicating image data for an overlap region that includes the discontinuity between individual segments of the sensors, with the duplicated data being provided to each of the output pipelines for segments that border the overlap region.

2. Description of the Related Art

Recent advances in manufacturing processes for electronic imaging sensors such as CCDs have resulted in electronic imaging sensors having many millions of pixels arranged in a two-dimensional array. Because of the large number of pixels, however, there has been an undesirable increase in the processing time needed merely to shift the data from the electronic imaging sensor.

Several proposals have been considered to address the increase in shift out time. According to one such proposal, the electronic imaging sensor is segmented into plural different disjoint areas, such as being divided into left and right halves. Each segment of the electronic imaging sensor is provided with its own output pipeline. As a consequence of this arrangement, it is possible to reduce the shift out time in proportion to the number of segments. For example, when an electronic imaging sensor is divided into mutually disjoint left and right halves, it is possible to reduce the shift out time by a factor of two.

One problem encountered in use of a segmented electronic imaging sensor is the discontinuity in image data formed at boundaries between each of the segments. If data shifted from each segment is immediately re-combined prior to any processing, the effects of such discontinuities can be minimized since image data for the entire image is available to the processor. However, it is becoming increasingly commonplace to provide a separate processor for each output pipeline. These processors work independently of each other, on the segment of electronic imaging sensor data corresponding to its output pipeline. Thus, when an image is formed from the re-combined image data processed individually by each processor, discontinuities at the sensor segment are readily apparent.

SUMMARY OF THE INVENTION

It is an object of the invention to reduce discontinuities at each segment of a segmented electronic imaging sensor by duplicating image data for an overlap region that includes the discontinuity between individual segments, and by providing the duplicated image data to the output pipeline of each segment of the electronic imaging sensor that borders the overlap region.

Thus, in one aspect, the invention is an electronic imaging sensor segmented into plural different disjoint segments, with each segment provided with a processor. Means are provided to duplicate pixel values for an overlap region that includes a segment boundary, with the duplicated pixel values being provided to the processors for the segments that border on the overlap region.

Because pixel data for an overlap region at segment boundaries is duplicated to each of the different processors, those processors are able to compensate more accurately for image discontinuities. For example, one common post-processing function on electronic imaging sensor data is to perform white balance correction whereby each processor adjusts the red, green and blue components of a color image so as to achieve an overall white balance. Because the present invention provides duplicated image data in overlap regions of each segment, individual processors are able to achieve an overall more pleasing white balance correction, with reduced discontinuities between image segments.

Preferably, the overlap region is more than one pixel wide, such as six or eight pixels wide, and preferably centered on the boundary between segments of the segmented electronic imaging sensor. Three different arrangements are currently preferred for providing such duplicated image data.

According to a first arrangement, circuitry is included directly on the sensor chip to include a charge (or voltage) duplication circuit for pixels in the overlap region. The duplicated pixels are thereafter shifted out of the electronic imaging sensor in ordinary course to respective ones of the output pipelines.

According to a second arrangement for duplicating pixels for an overlap region, some circuitry is included directly on the sensor chip itself, and other circuitry is provided off chip. The circuitry provided on the chip itself includes a separate shift-out signal line for pixels in the overlap region. This separate shift-out line is different from the output pipelines for the sensor segments. Pixels in the overlap region are stored in an intermediate buffer, preferably provided off-chip. It is the intermediate buffer that provides duplicate pixel values to each of the image processors associated with the output pipelines for the sensor segments.

According to a third arrangement for providing duplicate pixels, all circuitry is provided off-chip. The circuitry includes a communication link between the processors associated with respective ones of the output pipelines. The communication link allows the processors to share duplicate pixel image data from the overlap region.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
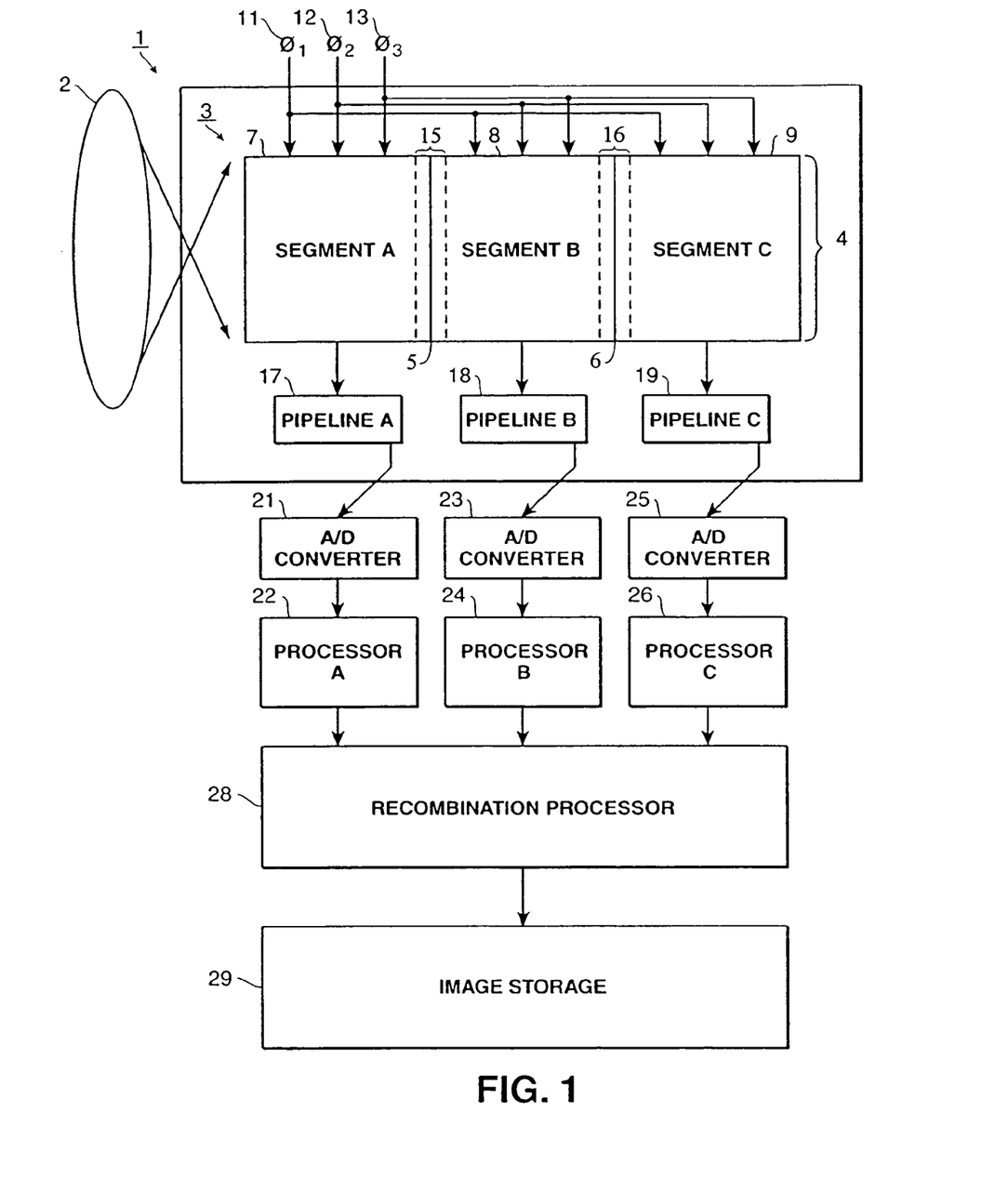
FIG. 1 is a representational view of an image storage device that can utilize an electronic imaging sensor according to the invention.

FIG. 1 is a representational view of an image storage device that can utilize an electronic imaging sensor according to the invention. Shown in FIG. 1 is electronic imaging sensor chip 1, such as a charge couple device (CCD) chip, along with lens system 2 for focussing incident light for an image onto sensor array 3 in unmasked area 4 of sensor chip 1. Sensor array 3 includes a plurality of mutually disjoint sensor segments. As shown in FIG. 1, these sensor segments include segment A 7, segment B 8 and segment C 9.

Each sensor segment preferably includes a plurality of rows of photosensitive cells. Each cell preferably corresponds to a pixel of the image data generated by the sensor chip. When light strikes one of these cells, the light generates a charge or voltage in the cell for the corresponding pixel.

After the light has generated these charges or voltages for a predetermined period of time corresponding to a single image, the charges or voltages are shifted out of each sensor segment so as to provide image data for the image focussed onto sensor array 3. Preferably, the charges or voltages are shifted out of each segment row-by-row. In addition, the sensor segments are preferably shuttered, either physically or electronically, so that no more charges or voltages are generated by incident light during the shifting operation. This shuttering tends to prevent or diminish image smearing that could occur from charges generated by incident light as the charges or voltages are shifted out of the sensor segments.

Preferably, phased clocks $\phi_1$ 11, $\phi_2$ 12 and $\phi_3$ 13 are provided for shifting the charges or voltages out of each sensor segment using techniques that are known in the art. Each of the phased clocks preferably has a ⅓ duty cycle and is offset from the other clocks. By successively clocking cells in a sensor segment using these clocks, the charges or voltages are shifted out of the segment. Preferably, the charges or voltages are shifted one row at a time into the pipelines corresponding to each of the sensor segments. Thus, rows of charges or voltages are shifted one by one from segment A 7 to pipeline A 17, from segment B 8 to pipeline B 18, and from segment C 9 to pipeline C 19.

After a row of charges or voltages is shifted into a pipeline, the charges or voltages for that row are serially output to an image processor, preferably through an A/D converter which converts the charges or voltages into digital pixel data. The image processor processes the pixel data, for example to perform white balance correction.

Thus, charges or voltages are serially output from pipeline A 17 to A/D converter 21 for conversion to digital pixel data, and the data is sent to processor A 22 for processing. Charges or voltages are serially output from pipeline B 18 to A/D converter 23 for conversion to digital pixel data, and the data is sent to processor B 24 for processing. Likewise, charges or voltages are serially output from pipeline C 19 to A/D converter 25 for conversion to digital pixel data, and the data is sent to processor C 26 for processing.

Next, another row of charges or voltages is shifted from the sensor segments to the pipelines, and the process is repeated until pixel data has been generated for all rows of the sensor segments. Recombination processor 28 then combines the pixel data from processor A 22, processor B 24 and processor C 26. Alternatively, recombination processor 28 processes the pixel data as it is generated by processor A 22, processor B 24 and processor C 26. The image data from recombination processor 28 preferably is stored in image storage 29.

After an entire image has been processed, sensor array 3 preferably is unshuttered (either physically or electronically), and another image is processed.

According to the invention, duplicate pixel values are generated for overlap regions that include boundaries between the sensor segments. Preferably, each overlap region includes cells corresponding to a width of a few pixels, such as cells for six or eight pixels, on each side of the corresponding boundary.

In FIG. 1, the boundaries between segments are boundary 5 between segment A 7 and segment B 8, and boundary 6 between segment B 8 and segment C 9. The corresponding overlap regions are overlap region 15 and overlap region 16, respectively.

Processors A 22, B 24 and C 26 compensate for discontinuities between the sensor segments using the duplicate pixel values. For example, when the processors correct white balance for their respective sensor segments, the processors use the duplicate pixel values for the overlap regions in the white balance calculations. As a result, a more pleasing white balance is achieved that tends to minimize discontinuities between image data for the sensor segments.

Three different embodiments of the invention for generating the duplicate pixel values are described hereinbelow. While these three embodiments are described in detail, the invention is not limited to these embodiments.

First Embodiment

Figure 2:
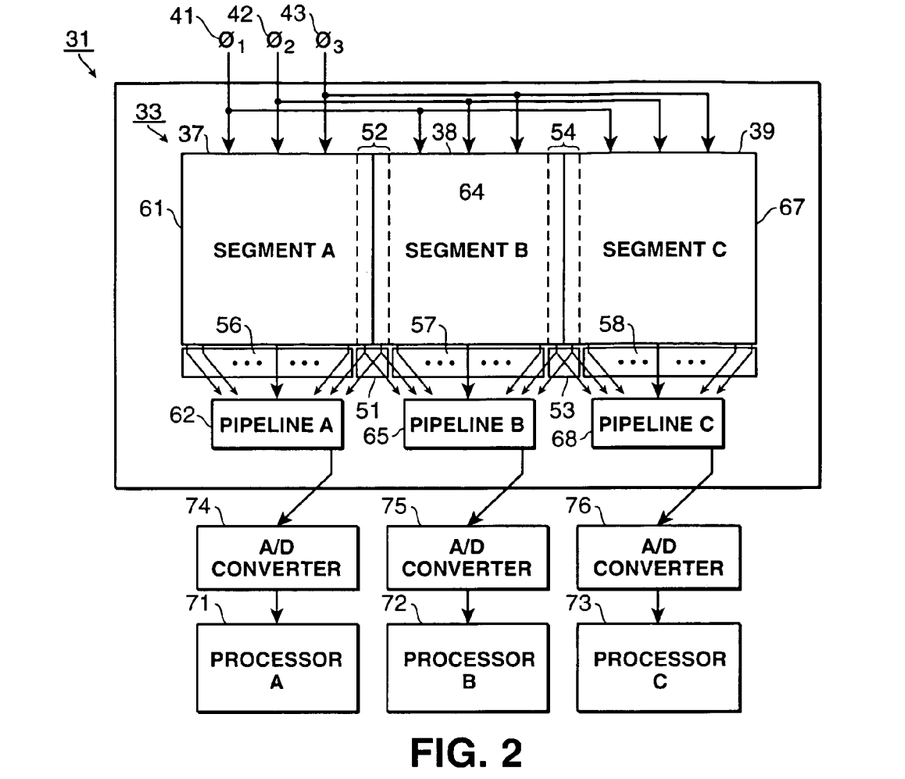
FIG. 2 is a representational view of a first embodiment of an electronic imaging sensor according to the invention, in which image data for an overlap region is duplicated by circuitry directly on a chip containing the electronic imaging sensor.

FIG. 2 is a representational view of a first embodiment of an electronic imaging sensor according to the invention.

Briefly, according to the first embodiment, an electronic imaging sensor includes a sensor array segmented into plural disjoint segments, a respective plurality of output pipelines, each of which corresponds to each of the plural segments of the sensor array, and circuitry for duplicating image data for an overlap region at each boundary between segments. The circuitry includes charge or voltage duplicating circuitry that obtains multiple outputs for each pixel in the overlap region. The duplication circuitry provides each of the multiple outputs to individual ones of the output pipelines that border on the overlap region.

In more detail, FIG. 2 shows electronic imaging sensor chip 31 having sensor array 33, which includes mutually disjoint sensor segments A, B and C, designated at numerals 37, 38 and 39. Each of these sensor segments outputs rows of charges or voltages for an image focussed thereon in accordance with phased clocks $\phi_1$ 41, $\phi_2$ 42 and $\phi_3$ 43, as explained above with reference to FIG. 1.

According to the first embodiment of the invention, image data for overlap regions is duplicated by circuitry that duplicates the charges or voltages for the overlap regions. Preferably, this circuitry is provided on sensor chip 31.

In FIG. 2, circuitry 51 duplicates the charges or voltages for overlap region 52, and circuitry 53 duplicates the charges or voltages for overlap region 54. One possible structure for each of circuitry 51 and 52 is explained below with reference to FIG. 3A.

Because the voltages or charges outside of the overlap regions are not duplicated, circuitry 56, 57 and 58 provide the charges or voltages from non-overlap regions outside of the overlap regions for each of the sensor segments to the respective pipelines without duplication. Thus, circuitry 56 provides charges or voltages from non-overlap region 61 to pipeline A 62, circuity 57 provides charges or voltages from non-overlap region 64 to pipeline B 65, and circuitry 58 provides charges or voltages from non-overlap region 67 to pipeline C 68. One possible structure for each of circuitry 56, 57 and 58 is explained below with reference to FIG. 3B.

Each of the pipelines is connected to a respective one of processor A 71, processor B 72 and processor C 73. Pipeline A 62 is preferably connected to processor A 71 through A/D converter 74; pipeline B 65 is preferably connected to processor B 72 through A/D converter 75; and pipeline C 68 is preferably connected to processor C 73 through A/D converter 76.

Figure 3A:
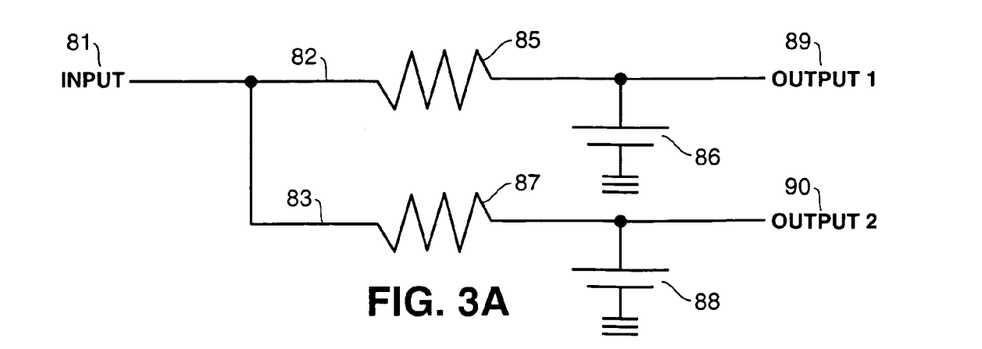
FIG. 3A is a schematic of charge duplicating circuitry for an overlap region of a sensor segment.

FIG. 3A is a schematic of charge duplicating circuitry for an overlap region of a sensor segment. As shown in FIG. 3A, charge 81 is input from an overlap region. Charge 81 travels down both of branches 82 and 83. Branch 82 is provided with resistor 85 and capacitor 86, and branch 83 is provided with resistor 87 and capacitor 88. These resistors and capacitors are preferably balanced so as to produce duplicate output charges 89 and 90 from input charge 81. Unshown circuitry compensates for any needed amplification, so as to compensate for attenuation by the resistor-capacitor network.

Figure 3B:
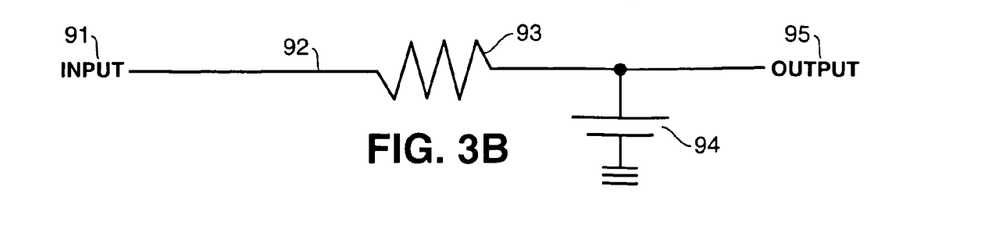
FIG. 3B is a schematic of charge circuitry for a non-overlap region of a sensor segment.

FIG. 3B is a schematic of charge circuitry for a non-overlap region of a sensor segment. This circuitry does not duplicate input charge 91 from a non-overlap region. Thus, the circuitry in FIG. 3B has one branch 92 with resistor 93 and capacitor 94, which operate to produce output charge 95 from input charge 91.

Figure 4:
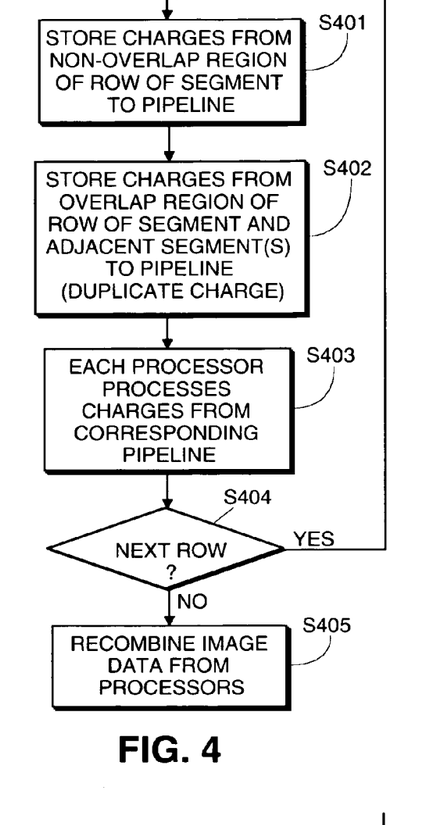
FIG. 4 is a flowchart for explaining generation of image data for an image formed on a sensor array, in which image data is duplicated for an overlap region at a boundary between two mutually disjoint segments of a sensor array according to a first embodiment of the invention.

FIG. 4 is a flowchart for explaining generation of image data from charges for an image formed on a sensor array, in which image data is duplicated for an overlap region at a boundary between two mutually disjoint segments of a sensor array according to the first embodiment.

Briefly, an electronic imaging sensor has a sensor array with plural mutually disjoint segments. The plural segments include at least a first segment and a second segment separated by a boundary. Charges or voltages from a non-overlap region of the first segment are stored into a pipeline. Charges or voltages from an overlap region of the first segment and the second segment also are stored into the pipeline. The charges or voltages stored in the pipeline are then provided to a processor.

In more detail, charges or voltages from a non-overlap region of a row of a sensor segment are stored to a pipeline in step S401. Charges or voltages from non-overlap region 61 are stored to pipeline A 62, from non-overlap region 64 are stored to pipeline B 65, and from non-overlap region 67 are stored to pipeline C 68.

In step S402, charges or voltages from an overlap region of a row of a segment and an adjacent segment are duplicated by duplicating circuitry, and the duplicated charges or voltages are stored to the pipelines for those segments. Charges or voltages from overlap region 52 are duplicated by circuitry 51 and stored to pipelines A 62 and B 65, and charges or voltages from overlap region 54 are duplicated by circuitry 53 and stored to pipelines B 65 and C 68.

In step S403, charges or voltages from the pipelines are processed by the respective processors. Charges or voltages from pipeline A 62 are processed by processor A 71 after conversion to digital pixel data by A/D converter 74. Charges or voltages from pipeline B 65 are processed by processor B 72 after conversion to digital pixel data by A/D converter 75, and charges or voltages from pipeline C 68 are processed by processor C 73 after conversion to digital pixel data by A/D converter 76.

In step S404, if more rows need to be processed to complete processing of the image, flow returns to step S401. Otherwise, flow proceeds to step S405, where image data from the processors is recombined so as to form a whole image corresponding to an image focussed onto sensor array 33.

By virtue of the foregoing, each of the processors for a segment receives image data for pixels in an overlap region or regions of an adjacent segment or segments. As a result, the processors corresponding to each of the segments are able to compensate for image discontinuities between the segments. For example, white balance correction for adjusting red, green and blue color components of a color image can be more readily performed in each of processors 71, 72 and 73 so as to achieve an overall white balance.

Second Embodiment

Figure 5:
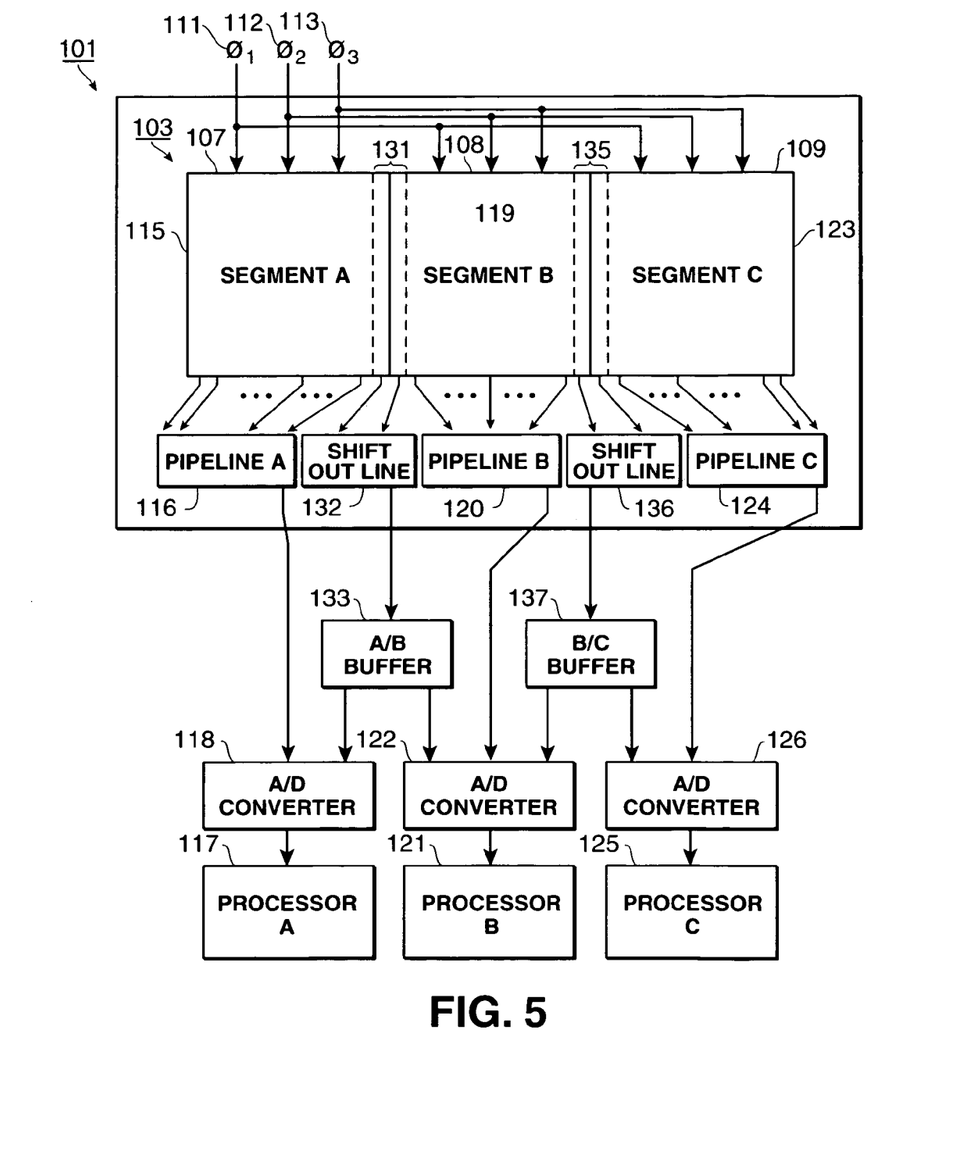
FIG. 5 is a representational view of a second embodiment of an electronic imaging sensor according to the invention, in which image data for an overlap region is stored to an intermediate buffer.

FIG. 5 is a representational view of a second embodiment of an electronic imaging sensor according to the invention.

Briefly, according to the second embodiment, an electronic imaging sensor includes a sensor array segmented into plural mutually disjoint segments, a respective plurality of output pipelines, each of which corresponds to each of the plural segments of the sensor array, and a respective plurality of processors. Each processor is coupled to a respective one of the output pipelines. The electronic imaging sensor also includes an output pipeline, or shift out line, for outputting pixel values of pixels in the overlap region to an intermediate buffer. The intermediate buffer provides duplicate pixel values to each processor whose segment borders the overlap region.

In more detail, FIG. 5 shows electronic imaging sensor chip 101 having sensor array 103, which includes sensor segment A 107, sensor segment B 108 and sensor segment C 109. Each of these sensor segments outputs rows of charges or voltages for an image focussed thereon in accordance with phased clocks $\phi_1$ 111, $\phi_2$ 112 and $\phi_3$ 113, as explained above with reference to FIG. 1.

According to the second embodiment of the invention, image data for overlap regions is duplicated by storing charges or voltages for overlap regions to shift out lines, and then to intermediate buffers that supply the charges to the processors for the segments for the overlap regions. Preferably, the shift out lines are provided on sensor chip 101, while the intermediate buffers are provided off sensor chip 101.

In FIG. 5, charges or voltages from non-overlap region 115 are stored to pipeline A 116, which preferably supplies the charges or voltages to processor A 117 through A/D converter 118. Likewise, charges or voltages from non-overlap region 119 are stored to pipeline B 120, which preferably supplies the charges or voltages to processor B 121 through A/D converter 122; and charges or voltages from non-overlap region 123 are stored to pipeline C 124, which preferably supplies the charges or voltages to processor C 125 through A/D converter 126.

Charges or voltages from overlap region 131 are sent to shift out line 132 and are stored to intermediate A/B buffer 133. This buffer supplies the charges or voltages to processor A 117 and processor B 121, preferably through A/D converter 118 and A/D converter 122 respectively. Likewise, charges or voltages from overlap region 135 are sent to shift out line 136 and are stored to intermediate B/C buffer 137. This buffer supplies the charges or voltages to processor B 121 and processor C 125, preferably though A/D converter 122 and A/D converter 126 respectively.

Figure 6:
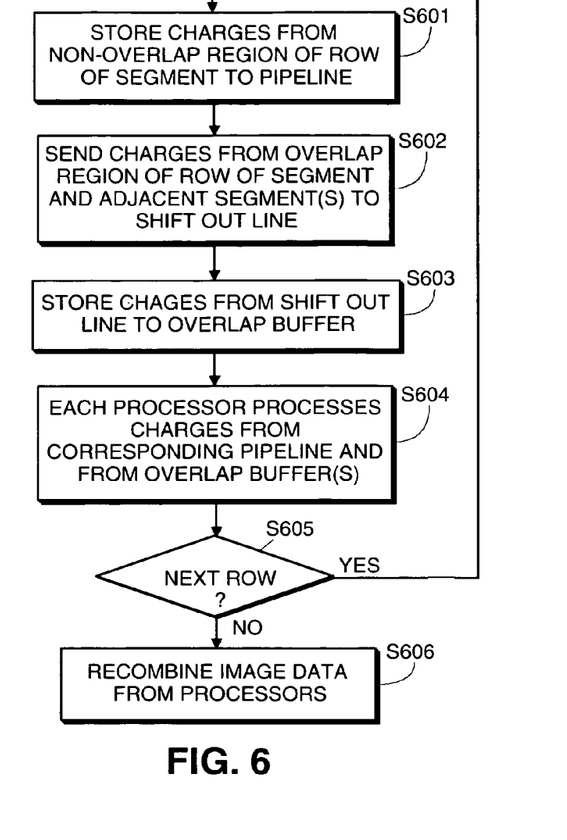
FIG. 6 is a flowchart for explaining generation of image data for an image formed on a sensor array, in which image data is duplicated for an overlap region at a boundary between two mutually disjoint segments of a sensor array according to a second embodiment of the invention.

FIG. 6 is a flowchart for explaining generation of image data from charges for an image formed on a sensor array, in which image data is duplicated for an overlap region at a boundary between two mutually disjoint segments of a sensor array according to the second embodiment.

Briefly, an electronic imaging sensor has a sensor array with plural disjoint segments. The plural segments include at least a first segment and a second segment separated by a boundary. Charges or voltages from a non-overlap region of the first segment are stored into a pipeline. Charges or voltages from the overlap region of the first segment and the second segment are sent to a shift out line. The charges or voltages from the shift out line are stored to an intermediate buffer. The charges or voltages are provided from the pipeline and from the intermediate buffer to a processor.

In more detail, charges or voltages from a non-overlap region of a row of a sensor segment are stored to a pipeline in step S601. Charges or voltages from non-overlap region 115 are stored to pipeline A 116, from non-overlap region 119 are stored to pipeline B 120, and from non-overlap region 123 are stored to pipeline C 124.

In step S602, charges or voltages from an overlap region of a row of a segment and an adjacent segment are sent to a shift out line. Charges or voltages from overlap region 131 are sent to shift out line 132, and charges or voltages from overlap region 135 are sent to shift out line 136.

The charges or voltages from the shift out lines are stored to intermediate buffers in step S603. Intermediate A/B buffer 133 stores the charges or voltages from shift out line 132, and intermediate B/C buffer 137 stores the charges or voltages from shift out line 136.

In step S604, charges or voltages from the pipelines and the intermediate buffers are sent to respective processors for processing, preferably through A/D converters. Charges or voltages from pipeline A 116 and intermediate A/B buffer 133 preferably are sent through A/D converter 118 to be processed by processor A 117; charges or voltages from pipeline B 120, intermediate A/B buffer 133 and intermediate B/C buffer 137 preferably are sent through A/D converter 122 to be processed by processor B 121; and charges or voltages from pipeline C 124 and intermediate B/C buffer 137 preferably are sent through A/D converter 126 to be processed by processor C 125. Thus, in the second embodiment, data for an overlap region is duplicated in step S604 by being sent from a corresponding intermediate buffer to processors for segments that border on the overlap region.

In step S605, if more rows need to be processed to complete processing of the image, flow returns to step S601. Otherwise, flow proceeds to step S606, where image data from the processors is recombined so as to form a whole image corresponding to an image focussed onto sensor array 103.

By virtue of the foregoing, each of the processors for a segment receives image data for pixels in an overlap region or regions of an adjacent segment or segments. As a result, the processors corresponding to each of the segments are able to compensate for image discontinuities between the segments.

Third Embodiment

Figure 7:
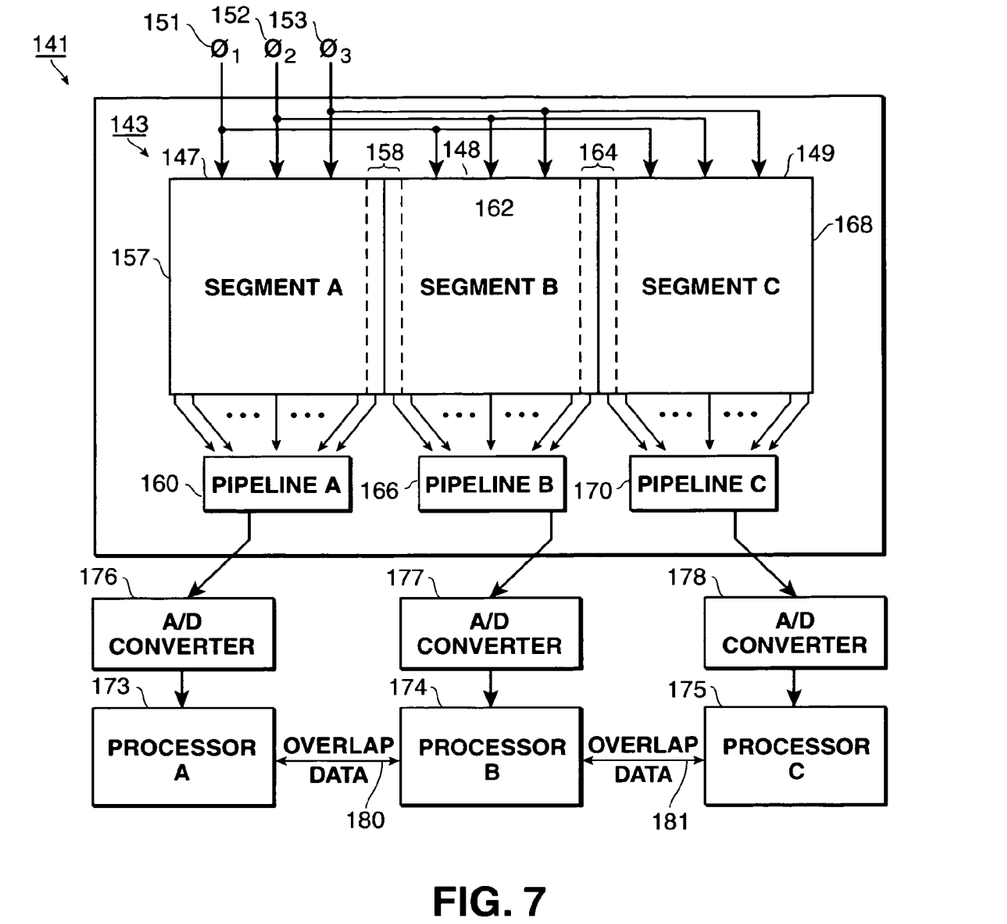
FIG. 7 is a representational view of a third embodiment of an electronic imaging sensor according to the invention, in which pixel data for an overlap region is communicated off-chip between processors.

FIG. 7 is a representational view of a third embodiment of an electronic imaging sensor according to the invention.

Briefly, according to the third embodiment, an electronic imaging sensor includes a sensor array segmented into plural mutually disjoint segments, a respective plurality of output pipelines, each of which corresponds to each of the plural segments of the sensor array, and a respective plurality of processors. Each processor is coupled to a respective one of the output pipelines. A communication link is provided between processors that border an overlap region, and duplicate pixels are communicated between the processors over the communication link.

In more detail, FIG. 7 shows electronic imaging sensor chip 141 having sensor array 143, which includes sensor segment A 147, sensor segment B 148 and sensor segment C 149. Each of these sensor segments outputs rows of charges or voltages for an image focused thereon in accordance with phased clocks $\phi_1$ 151, $\phi_2$ 152 and $\phi_3$ 153, as explained above with reference to FIG. 1.

According to the third embodiment of the invention, image data for overlap regions is duplicated by communicating the image data over communication lines between processors for the respective image regions. Preferably, the processors and the communication lines are provided off-chip.

In FIG. 7, charges or voltages from segment A 147, including non-overlap region 157 and a part of overlap region 158 in segment A 147, are stored to pipeline A 160. Likewise, charges or voltages from segment B 148, including non-overlap region 162 and parts of overlap regions 158 and 164 in segment B 148, are stored to pipeline B 166; and charges or voltages from segment C 149, including non-overlap region 168 and a part of overlap region 164 in segment C 149, are stored to pipeline C 170.

Each of the pipelines provides the charges or voltages to respective ones of processors A 173, B 174 and C 175, preferably through A/D converters 176, 177 and 178. These processors communicate via communication lines 180 and 181 so as to share overlap pixel data for overlap regions shared by the corresponding sensor segments. Thus, in the preferred embodiment, processors A 173 and B 174 communicate pixel data for overlap region 158 over communication line 180, and processors B 174 and C 175 communicate pixel data for overlap region 164 over communication line 181.

Figure 8:
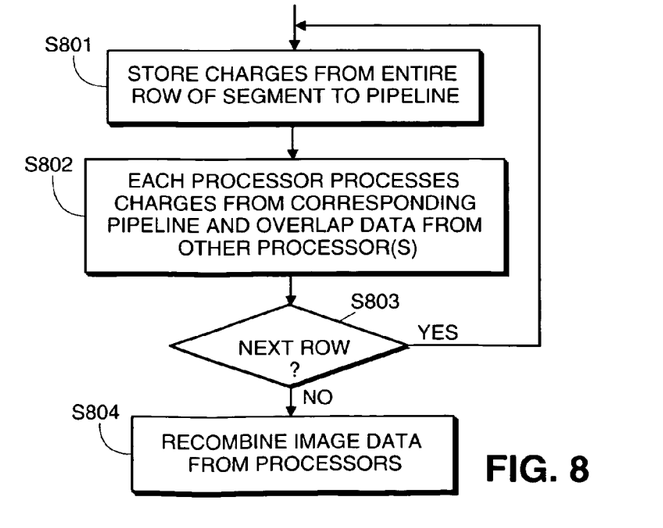
FIG. 8 is a flowchart for explaining generation of image data for an image formed on a sensor array, in which image data is duplicated for an overlap region at a boundary between two mutually disjoint segments of a sensor array according to a third embodiment of the invention.

FIG. 8 is a flowchart for explaining generation of image data from charges for an image formed on a sensor array, in which image data is duplicated for an overlap region at a boundary between two mutually disjoint segments of a sensor array according to the second embodiment.

Briefly, an electronic imaging sensor has a sensor array with plural disjoint segments. The plural segments include at least a first segment and a second segment separated by a boundary. Charges or voltages from the first segment are stored into a pipeline. The charges or voltages are provided from the pipeline to a first processor for processing pixel data for the first segment. Pixel data for the overlap region is communicated between the first processor and a second processor, wherein the second processor is for processing pixel data for the second segment.

In more detail, charges or voltages from an entire row of a sensor segment are stored to a pipeline in step S801. Charges or voltages from sensor segment A 147 are stored to pipeline A 160, from sensor segment B 148 are stored to pipeline B 166, and from sensor segment C 149 are stored to pipeline C 170.

In step S802, charges or voltages from the pipelines are processed by respective ones of the processors, along with overlap data provided from processors for adjacent sensor segments. Processor A 173 processes charges or voltages from pipeline A 160, preferably received through A/D converter 176, along with overlap data from processor B 174 for a part of overlap region 158 in segment B 148. Processor B 174 processes charges or voltages from pipeline B 166, preferably received through A/D converter 177, along with overlap data from processor A 173 for a part of overlap region 158 in segment A 147 and overlap data from processor C 175 for a part of overlap region 164 in segment C 149. Processor C 175 processes charges or voltages from pipeline C 170, preferably received through A/D converter 178, along with overlap data from processor B 174 for a part of overlap region 164 in segment B 148. The overlap data is communicated between the processors over communication lines 180 and 181.

In step S803, if more rows need to be processed to complete processing of the image, flow returns to step S801. Otherwise, flow proceeds to step S804, where image data from the processors is recombined so as to form a whole image corresponding to an image focussed onto sensor array 143.

By virtue of the foregoing, each of the processors for a segment receives image data for pixels in an overlap region or regions of an adjacent segment or segments. As a result, the processors corresponding to each of the segments are able to compensate for image discontinuities between the segments.

[Variations]

Instead of receiving data through A/D converters, the processors can be capable of directly processing the charges or voltages. For example, each processor can include an embedded A/D converter or other circuitry for performing image processing on the charges or voltages. In that case, the A/D converters shown in FIGS. 1, 2, 5 and 7 can be omitted.

It is possible to combine any of the features of each of the embodiments described above. In addition, an electronic imaging sensor chip could include a sensor array that has more or less sensor segments than the three segments discussed herein, arranged vertically, horizontally, in a grid, or in some other fashion.

Accordingly, while the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. An imaging sensor which includes:
a sensor array segmented into plural disjoint segments;
a respective plurality of output pipelines, provided in said imaging sensor, one of said output pipelines corresponding to each of said plural segments of the sensor array; and
duplicating means, provided in said imaging sensor, for duplicating image data for an overlap region at each boundary between segments,
wherein said duplicating means comprises charge or voltage duplicating circuitry, provided in said imaging sensor, that obtains multiple outputs for each pixel in the overlap region, and wherein said duplication circuitry provides each of the multiple outputs to individual ones of said output pipelines that border on the overlap region.

2. An imaging sensor which includes:
a sensor array segmented into plural disjoint segments;
a respective plurality of output pipelines, provided in said imaging sensor, one of said output pipelines corresponding to each of said plural segments of the sensor array;
duplicating means, provided in said imaging sensor, for duplicating image data for an overlap region at each boundary between segments; and
a respective plurality of processors, each processor coupled to a respective one of the output pipelines,
wherein said duplicating means includes an output pipeline, provided in said imaging sensor, for outputting pixel values of pixels in the overlap region to an intermediate buffer, the intermediate buffer providing duplicate pixel values to each processor whose segment borders the overlap region.

3. An imaging sensor according to claim 2, wherein the intermediate buffer is provided off-chip from the sensor array.

4. An imaging sensor which includes:
a sensor array segmented into plural disjoint segments;
a respective plurality of output pipelines, provided in said imaging sensor, one of said output pipelines corresponding to each of said plural segments of the sensor array;
duplicating means, provided in said imaging sensor, for duplicating image data for an overlap region at each boundary between segments; and
a respective plurality of processors, each processor coupled to a respective one of the output pipelines,
wherein a communication link is provided between processors that border the overlap region, and wherein duplicate pixels are communicated between processors over the communication link.

5. A method in an imaging sensor which includes a sensor array segmented into plural disjoint segments including at least a first segment and a second segment separated by a boundary and an output pipeline and a duplicating circuit, wherein said output pipeline and said duplicating circuit are provided in said imaging sensor, the method comprising the step of:
duplicating, by said duplicating circuit, image data for an overlap region at the boundary, which further comprises the steps of:
storing charges or voltages from a non-overlap region of the first segment into said output pipeline;
storing charges or voltages from the overlap region of the first segment and the second segment into said output pipeline; and
providing charges or voltages from said output pipeline to a processor.

6. A method in an imaging sensor which includes a sensor array segmented into plural disjoint segments including at least a first segment and a second segment separated by a boundary and an output pipeline and a duplicating circuit, wherein said output pipeline and said duplicating circuit are provided in said imaging sensor, the method comprising the step of:
duplicating, by said duplicating circuit, image data for an overlap region at the boundary, which further comprises the steps of:

storing charges or voltages from a non-overlap region of the first segment into said output pipeline;

sending charges or voltages from the overlap region of the first segment and the second segment to a shift out line;

storing charges or voltages from the shift out line to an intermediate buffer; and providing charges or voltages from said output pipeline and from the intermediate buffer to a processor.

7. A method according to claim 6, wherein the intermediate buffer is provided off-chip from the sensor array.

8. A method in an imaging sensor which includes a sensor array segmented into plural disjoint segments including at least a first segment and a second segment separated by a boundary and output pipeline and a duplicating circuit, wherein said output pipeline and said duplicating circuit are provided in said imaging sensor, the method comprising the step of:

duplicating, by said duplicating circuit, image data for an overlap region at the boundary, which further comprises the steps of:

storing charges or voltages from the first segment into said output pipeline;

providing charges or voltages from said output pipeline to a first processor, the first processor for processing pixel data for the first segment; and communicating pixel data for the overlap region between the first processor and a second processor, the second processor for processing pixel data for the second segment.

\* \* \* \* \*